Aug. 3, 1943.                J. L. PERKINS                2,326,103
                          WORK INDEXING APPARATUS
                          Filed Dec. 4, 1941          2 Sheets-Sheet 1
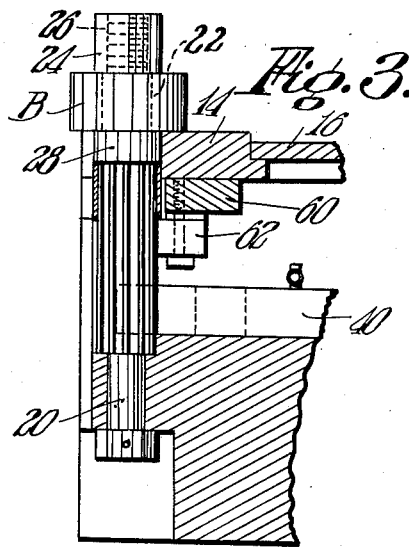
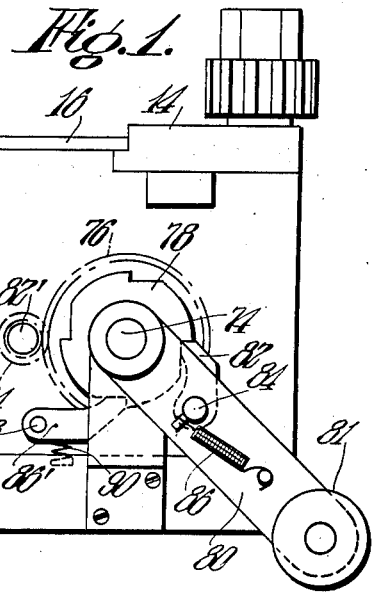
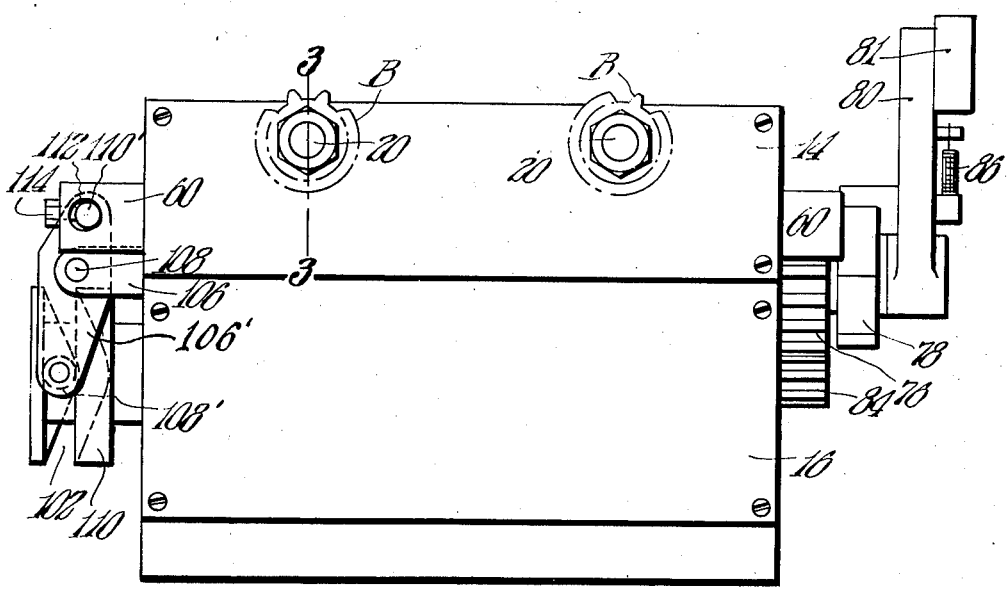
INVENTOR.
Julian L. Perkins.

Patented Aug. 3, 1943

2,326,103

UNITED STATES PATENT OFFICE 2,326,103

WORK INDEXING APPARATUS

Julian L. Perkins, West Springfield, Mass., assignor to Perkins Machine and Gear Company, West Springfield, Mass., a corporation of Massachusetts Application December 4, 1941, Serial No. 421,657

3 Claims. (Cl. 90—56)

This invention relates to improvements in apparatus for indexing and holding work.

The principal objects of the invention are directed to the provision of apparatus for indexing and holding work for the operation of a cutting tool and is particularly adapted for holding a gear blank for the operation of a tool or tools for forming the teeth therein and indexing the same for subsequent operations.

It is customary to form the teeth of gears by means of a broach reciprocable back and forth at the periphery thereof and in parallelism with the axis of the blank. The broach cuts the grooves to form the sides of the teeth and after the forming of each groove the blank is indexed.

It is difficult with prior art apparatus particularly with small gears to hold the blank and index it accurately subsequent to the cutting operations with the result the teeth are non-uniformly spaced and are non-uniform in their dimensions. There are likely to be teeth that are thicker or thinner at the pitch line for instance.

According to this invention, the apparatus is constructed and arranged to hold the blank firmly for the cutting operations and to index or rotate the said blank after the cutting operations thereby to obtain uniform teeth, uniformly spaced.

In the drawings:

Fig. 1 is an end elevational view of an indexing apparatus embodying the novel features of the invention;

Fig. 2 is a plan view of the apparatus shown in Fig. 1;

Fig. 3 is a sectional elevational view on the line 3—3 of Fig. 2;

Figure 4:
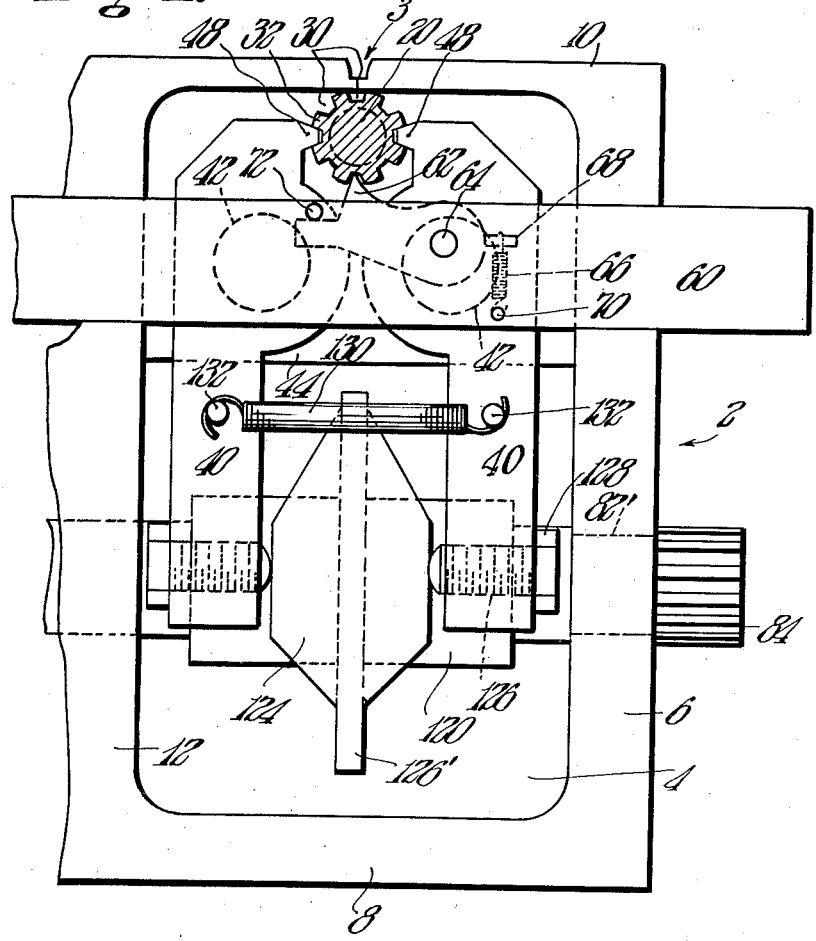
Fig. 4 is a partial plan view of the apparatus shown in Figs. 1 and 2 with certain parts removed for clearness.
Figure 5:
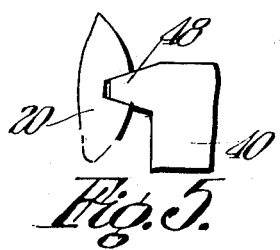
Fig. 5 is an enlarged partial plan view of one of the arbor holding members.

Referring now to the drawings in detail, the invention will be fully described.

A support in the form of a housing 2 has a bottom wall 4, end walls 6, front and rear walls 8 and 10, and an intermediate wall 12. These walls provide an open upper side that is closed by plates 14 and 16 secured thereto in any convenient manner.

There are two arbors such as 20 rotatable on vertical axes. There may be as many of such arbors as may be desired, hence a description of one arbor will suffice for the description of all.

The arbors are provided with upper portions 22 on which a gear blank B is receivable and a nut 24 in threaded engagement with the upper end 26 thereof is provided for clamping the blank B to a collar 28 thereof.

The intermediate portion of the arbor is provided with alternate grooves and teeth corresponding in number to the grooves and teeth to be cut in the blank B.

With refernce to Fig. 4, the tool for cutting the blank moves up and down parallel to the axis of arbor 20 and a groove 3 is provided for tool clearance up and down in wall 10.

With the blank clamped to the arbor the said blank is held in position for the tooth forming operation and after each groove is cut, the arbor is indexed preferably for the next adjacent groove.

The means for holding and indexing the arbor will now be described.

Similar holding members 40 are pivoted on studs 42 projecting upwardly from a boss 44 for swinging movements in vertical planes and they have teeth 48 receivable in the grooves 30 of the arbor when in holding position.

The teeth and grooves of the arbor are accurately spaced and formed as are the teeth 48 of the holding member so that the arbor may be firmly held against rotative movements and when indexed or rotated, the grooves and teeth of the blank are accurately spaced.

The grooves 30 and teeth 48 are formed to permit the teeth to freely enter and withdraw from the grooves as the members 40 are swung and also so that when the teeth enter the grooves the arbor is moved in one direction or the other into accurate indexing position.

A bar 60 is reciprocable in opposite directions and a pawl 62 as shown in Fig. 4 is pivoted thereto at 64 for engaging with the grooves of the arbor and rotating it one space as the bar is moved in one direction. There is a spring 66 secured to a projection 68 of the pawl and a pin 70 of the bar so as to urge the pawl into operative engagement with the arbor and a stop 72 of the bar limits swinging movement of the pawl.

A stud 74 in one end wall 6 of the housing has a combined gear 76 and ratchet 78 rotatable thereon. A lever 80 swingable on the stud has a pawl 82 pivoted thereto at 84 which is urged into engagement with the ratchet by a spring 86 all as shown in Fig. 1.

A shaft 82' is rotatable in the housing and it has a gear 84 fixed thereto and in mesh with gear 76. A pawl 86' pivoted to the housing at 88 is spring pressed by a spring 90 into engagement with ratchet 78.

It is intended that the lever 80 be operated on each stroke of the broach carrying mechanism a sufficient distance to rotate ratchet 78 one notch and rotate shaft 82' through one revolution and for that purpose a roll 81 is provided on the lever for engagement by the broach carrying mechanism. That is the mechanism carrying the broach for acting on the gear blank or the broaching machine may be arranged to act on the lever 80 so as to bring about indexing the blank or blanks to be acted upon by the broaching mechanism.

A cam 110 is provided on the other end of shaft 82' which has a groove 102, see Fig. 2. A bracket 106 fixed to the housing has a lever 106' pivoted thereto at 108. Said lever has a roll 108' in operative engagement with the cam groove and its other end carries a stud 110' disposed in an aperture 112 of bar 60 there being an adjusting screw 114 associated with the bar in engagement with stud 110'.

As shaft 82' is rotated through one revolution the bar 60 is moved back and forth. To accomplish this the groove 102 of cam 110 extends back and forth axially of and around the cam so as to swing lever 106' as shaft 82 rotates.

A cam member 120 is reciprocable on shaft 82' but is rotated thereby. This may be accomplished by a key of said shaft in sliding engagement with a groove provided in the bore of the cam.

The cam 120 has a relatively wide circumferential part 124 and a narrow circumferential part 126' as shown in Fig. 4. The members 40 have adjusting screws 126 in their outer ends provided with lock nuts 128. The inner ends of these screws are adapted to bear on the sides of the cam parts 124 and 126' successively as cam 120 is rotated by the shaft 82' during rotation of said shaft.

A tension spring 130 has its ends attached to studs 132 of the members 40 for swinging the free ends of members 40 towards the cam.

The parts are so constructed and arranged that as shaft 82' is rotated from rest position, the narrow part 126 of the cam 120 rotates into position between the ends of members 40 so that the spring 130 swings said members towards one another to withdraw the teeth 48 thereof from the grooves of the arbor. The slide is moved longitudinally so that pawl 62 engages and rotates the arbor one space after which the wider part 124 of cam 120 is rotated between members 40 to swing the said members and teeth 48 thereof into the notches 39 of the arbor. The outer ends of members 40 are held in spaced apart relation by the wide part 124 of the cam and thereby hold the teeth 48 in the grooves of the arbor until the next rotation of the shaft 82'. The outer ends of members are urged towards the cam by spring 130 at all times and are moved outwardly by the wide part 124. As the cam rotates the levers are swung in and out so the teeth 48 engage or disengage the arbor.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. An apparatus for holding a gear blank and indexing the same for successive groove and tooth forming operations comprising in combination, a support, a rotatable arbor for supporting a gear blank to be cut with teeth forming grooves having grooves and teeth corresponding in number to the number of grooves and teeth to be formed on said blank, pivotally mounted members having parts receivable in grooves at opposite sides of said arbor, a movable member engageable with said grooves of the arbor to rotate the same, means for actuating said pivotally mounted members, means for actuating said movable member and operative connections between said means.

2. An apparatus for holding a gear blank and indexing the same for successive groove and tooth forming operations comprising in combination, a support, a rotatable arbor for supporting a gear blank to be cut with teeth forming grooves having grooves and teeth corresponding in number to the number of grooves and teeth to be formed on said blank, pivotally mounted members having parts at one end thereof receivable in grooves at opposite sides of the arbor for holding the same against rotation and having free ends, and means acting on the free ends of said members urging them into holding position.

3. An apparatus for holding a gear blank and indexing the same for successive groove and tooth forming operations comprising in combination, a support, a rotatable arbor for supporting a gear blank to be cut with teeth forming grooves having grooves and teeth corresponding in number to the number of grooves and teeth to be formed on said blank, pivotally mounted members having parts at one end thereof receivable in grooves at opposite sides of the arbor for holding the same against rotation and having free ends, and means acting on the free ends of said members urging them into holding position, and movable means receivable in the grooves of said arbor to rotate the same.

JULIAN L. PERKINS.